United States Patent
Yamazoe (10) Patent No.: US 7,317,511 B2
(45) Date of Patent: Jan. 8, 2008

(54) LIGHT MODULATOR, AND OPTICAL APPARATUS USING THE SAME

(75) Inventor: Kenji Yamazoe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 11/233,657

(22) Filed: Sep. 23, 2005

(65) Prior Publication Data

US 2006/0066830 A1 Mar. 30, 2006

(30) Foreign Application Priority Data

Sep. 24, 2004 (JP) ............................. 2004-278224
Aug. 11, 2005 (JP) ............................. 2005-232946

(51) Int. Cl.
*G03B 27/54* (2006.01)

(52) U.S. Cl. .......................................... 355/67; 355/71

(58) Field of Classification Search ................. 355/57, 355/67, 75, 53, 71; 430/5, 2, 20
See application file for complete search history.

(56) References Cited

U.S. PATENT DOCUMENTS

| 5,148,157 A | * | 9/1992 | Florence | ....................... 345/84 |
|---|---|---|---|---|
| 5,606,441 A | * | 2/1997 | Florence et al. | ............. 359/212 |
| 6,489,984 B1 | * | 12/2002 | Johnson | ....................... 347/239 |
| 6,600,606 B2 | | 7/2003 | Sekine | |
| 2005/0190354 A1 | * | 9/2005 | de Jager | ....................... 355/67 |
| 2005/0200821 A1 | * | 9/2005 | Gui | .............................. 355/67 |
| 2005/0243398 A1 | * | 11/2005 | Latypov | ...................... 359/237 |
| 2006/0001855 A1 | * | 1/2006 | Lof et al. | ...................... 355/69 |
| 2006/0209250 A1 | * | 9/2006 | Holmes | ....................... 349/202 |

FOREIGN PATENT DOCUMENTS

| JP | 11-237602 | 8/1999 |
|---|---|---|
| JP | 2003-059804 | 2/2003 |

OTHER PUBLICATIONS

Solgaard et al, "Deformable grating optical modulator", Optics Letters, vol. 17, No. 9, May 1, 1992, pp. 688-690.

* cited by examiner

*Primary Examiner*—D. Rutledge
(74) *Attorney, Agent, or Firm*—Morgan & Finnegan, LLP (57) ABSTRACT

A light modulator for modulating a phase distribution of incident light includes an element that provides the incident light with three or more types of phase differences, wherein the element includes three or more displaceable light reflective bands, and wherein the light modulator has plural pixels each including the element.

14 Claims, 12 Drawing Sheets

PRIOR ART

FIG. 12A

PRIOR ART

FIG. 12B

PRIOR ART

FIG. 13

PRIOR ART

FIG. 14

LIGHT MODULATOR, AND OPTICAL APPARATUS USING THE SAME

BACKGROUND OF THE INVENTION

The present invention relates generally to a light modulator (also referred to as a spatial light modulator), and a phase modulation type light modulator that modulates a phase distribution, and an apparatus using the same, such as an exposure apparatus and a projection display apparatus, such as a projector. This invention is suitable, for example, maskless exposure that utilizes the light modulator and dispenses with a photo-mask or reticle as an original.

A projection optical system has been conventionally used to expose a mask pattern onto a substrate on which a photosensitive agent is applied in manufacturing a semiconductor device and a liquid crystal panel. However, as the finer processing to the mask pattern and a larger mask size are demanded with the improved integration and increased area of the device, an increase of the mask cost becomes problematic. Accordingly, the maskless exposure that dispenses with the mask for exposure has called attentions.

One exemplary attractive maskless exposure is a method for projecting a pattern image onto a substrate using a phase-modulation type light modulator. The light modulator is a parallel-connected type device, and the number of pixels per unit time may possibly be increased enormously. The phase modulation needs a minute displacement of a mirror, and thus is suitable for high-speed operation. In particular, a grating light valve ("GLV") type light modulator that uses a modulated pattern of a diffraction grating is suitable for a large amount of data transfers, and a maskless exposure apparatus that transfers enormous data amount. The maskless exposure apparatus that uses the light modulator instead of the mask to modulate the exposure light in accordance with a desired pattern, and condenses the pattern via a projection optical system, and forms the pattern on the substrate. GLV is disclosed, for example, in Optics Letters, Vol. 17, pp. 688-690 (1992).

Figure 12A:
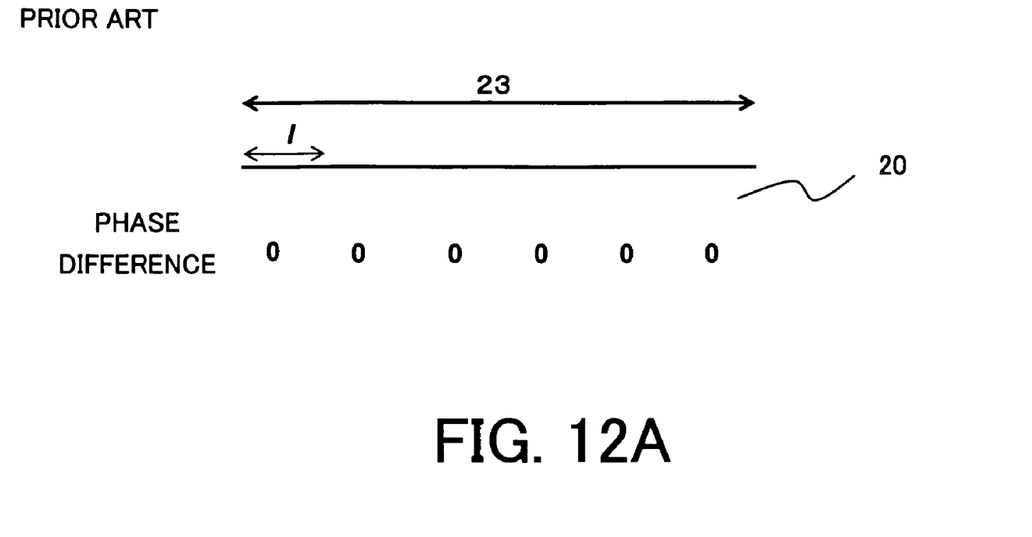
FIG. 12A shows a relationship between the section of a conventional GLV and the phase differences given by the GLV when the GLV turns off.
Figure 12B:
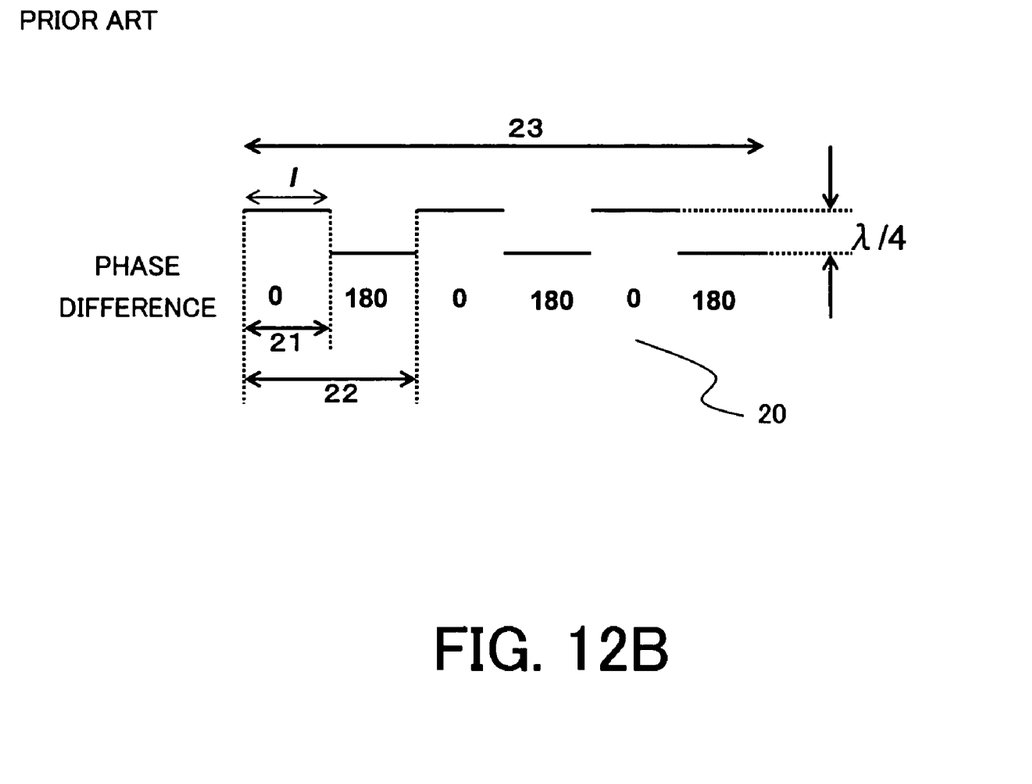

Referring now to FIGS. 12A and 12B, a description will be given of an operational principle of a conventional GLV 20. Here, FIG. 12A shows a relationship between the section of the GLV 20 and phase differences given by the GLV 20 when the GLV 20 turns off. FIG. 12B shows a relationship between the section of the GLV 20 and phase differences given by the GLV 20 when the GLV 20 turns on.

Each element in the GLV 20 has a pair of catoptric bands or ribbons 21, and each pixel 23 includes three elements 22. The GLV 20 is a reflection-type phase modulator that has plural pixels 23 arranged in parallel. One of ribbons 21 in each element 22 is connected to a switch (not shown), and configured to vary its level, for example, when the voltage is applied to it.

In operation, when the switch turns off, as shown in FIG. 12A, all the ribbons 22 have the same level. When the switch turns on, as shown in FIG. 12B, the ribbons 21 fall alternately by a quarter of the irradiation wavelength, and the reflected light receives a phase difference of 180° between two adjacent ribbons 21. When the switch turns off, only the 0th order diffracted light is reflected since the reflected light is reflected while its phase is not modulated. On the other hand, when the switch turns on, the reflected light is phase-modulated and the ±1st order diffracted lights are reflected.

Figure 13:
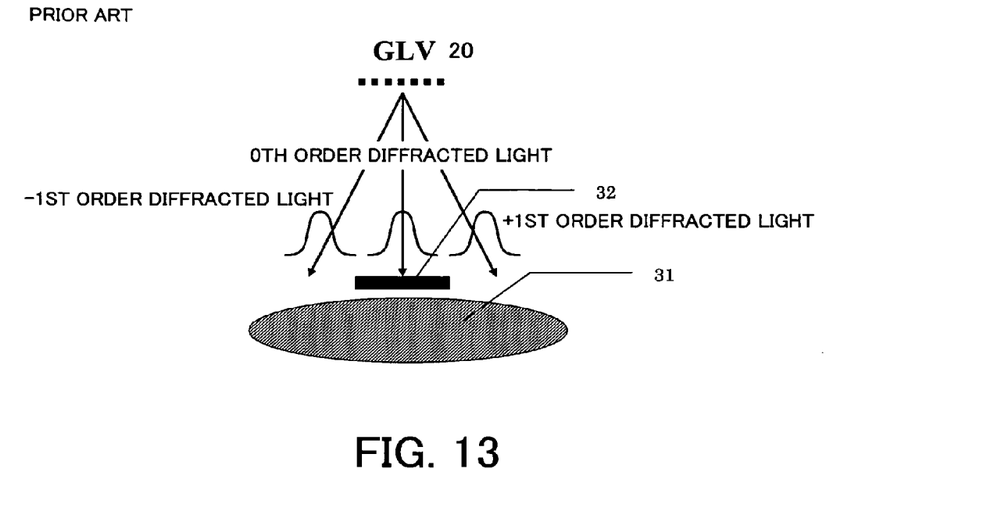
FIG. 13 schematically show an optical system that controls an irradiation of the light utilizing the GLV shown in FIGS. 12A and 12B.

Referring now to FIG. 13, a description will be given of control over the diffracted light using the GLV 20. Here, FIG. 13 is a schematic view for explaining the control over the diffraction light using the GLV 20. A filter 32 that blocks the 0th order light is provided between a lens 31 and the GLV 20. When the switch turns off, no light is incident upon the lens 31. When the switch turns on, the ±1st order diffracted lights are incident upon the lens 31. A maskless exposure apparatus that controls the exposure light is configured when it installs the GLB 20 instead of the mask and the lens 31 is regarded as the projection optical system.

Other prior art include Japanese Patent Applications, Publication No. 11-237602 and 2003-59804.

Figure 14:
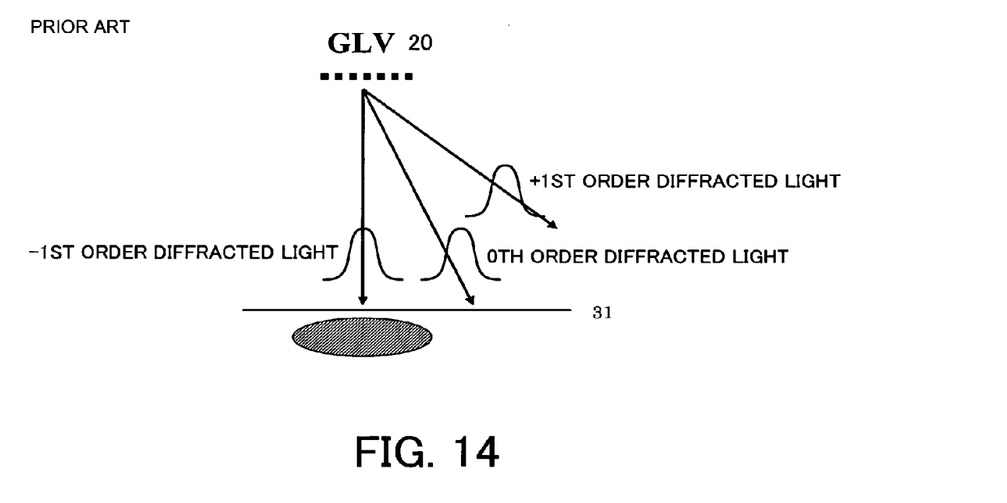
FIG. 14 schematically show another optical system that controls an irradiation of the light utilizing the GLV shown in FIGS. 12A and 12B.

In the maskless exposure apparatus equipped with the GLV 20 shown in FIG. 13, the projection optical system 31 should have a wide diameter to accept the ±1st order diffracted lights, causing a big apparatus. In addition, two lights incident upon the projection optical system 31 may interfere with each other and result in an unnecessary pattern. Accordingly, a combination of the GLV 20 and an oblique incident illumination is conceivable as shown in FIG. 14. When the switch turns off, this configuration does not supply the light to the lens 31 since only the 0th order light occurs. In addition, when the switch turns on, the ±1st order diffracted lights occur and one of them, which is the −1st order diffracted light in FIG. 14, enters the lens 31 by adjusting the irradiation angle onto the GLV.

As a result, a small size is enough for the projection optical system 31. In addition, only one light entering the projection optical system 31 realizes the high-quality exposure that resolves only a predetermined pattern. However, a problem of reduced exposure dose and thus lowered throughput occurs because one of the ±1st order diffracted lights is not used.

BRIEF SUMMARY OF THE INVENTION

Accordingly, it is an exemplary object of the present invention to provide a phase modulation type light modulator that efficiently extracts the diffracted light of the desired order, and an optical apparatus using the same.

A light modulator according to one aspect of the present invention for modulating a phase distribution of incident light includes an element that provides the incident light with three or more types of phase differences, wherein the element includes three or more displaceable light reflective bands, and wherein the light modulator has plural pixels each including the element.

An optical apparatus that equipped with the above light modulator, such as an exposure apparatus and a projection type image display apparatus constitutes one aspect of the present invention. A device manufacturing method according to still another aspect of the present invention includes the steps of exposing an object using the above exposure apparatus, and developing the object that has been exposed. Claims for a device manufacturing method for performing operations similar to that of the above exposure apparatus cover devices as intermediate and final products. Such devices include semiconductor chips like an LSI and VLSI, CCDs, LCDs, magnetic sensors, thin film magnetic heads, and the like.

Other objects and further features of the present invention will become readily apparent from the following description of the preferred embodiments with reference to the accompanying drawings.

BRIEF DESCRIPTION OF THE DRAWINGS

FIG. 2A shows a relationship between the section of a GLV according to one embodiment of the present invention and phase differences given by the GLV when the GLV turns on.

FIG. 3A shows a relationship between the section of a GLV according to another embodiment of the present invention and phase differences given by the GLV when the GLV turns on.

FIG. 4A shows a relationship between the section of a GLV according to still another embodiment of the present invention and phase differences given by the GLV when the GLV turns on.

FIG. 5A shows a relationship between the section of a GLV according to still another embodiment of the present invention and phase differences given by the GLV when the GLV turns on.

FIG. 6A shows a relationship between the section of the GLV shown in FIG. 4A and phase differences given by the GLV when the GLV turns on.

FIG. 6B shows a relationship between the section of a GLV according to still another embodiment of the present invention and phase differences given by the GLV when the GLV turns on.

FIG. 7 shows a relationship between the section of a GLV according to still another embodiment of the present invention and phase differences given by the GLV when the GLV turns on.

FIG. 12B shows a relationship between the section of a conventional GLV and the phase differences given by the GLV when the GLV turns on.

DETAILED DESCRIPTION OF THE PREFERRED EMBODIMENTS

First Embodiment

The following embodiment sometimes compares the diffraction efficiency between the conventional GLV and the inventive GLV. The "diffraction efficiency," as used herein, means a diffracted light intensity distribution normalized by the 0th order diffracted light intensity when a switch turns off. In addition, the ±1st order diffracted lights appear at positions of ±0.5 in the coordinate on the Fourier transformation surface, since the pixel size of all the GLVs is set to 2.

With reference to FIGS. 2A, 2B, 5A and 5B, a description will be given of GLV 120 to 120D according to a first embodiment of the present invention.

Figure 2A:
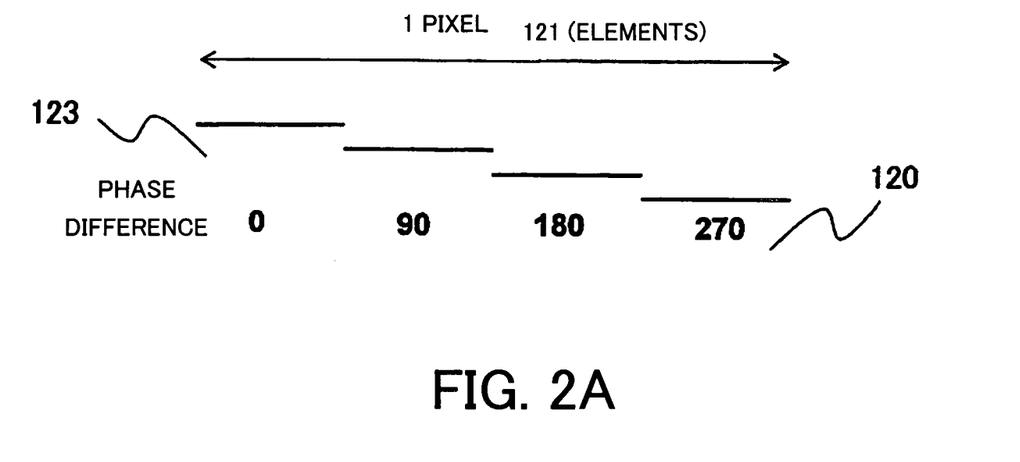
Figure 2B:
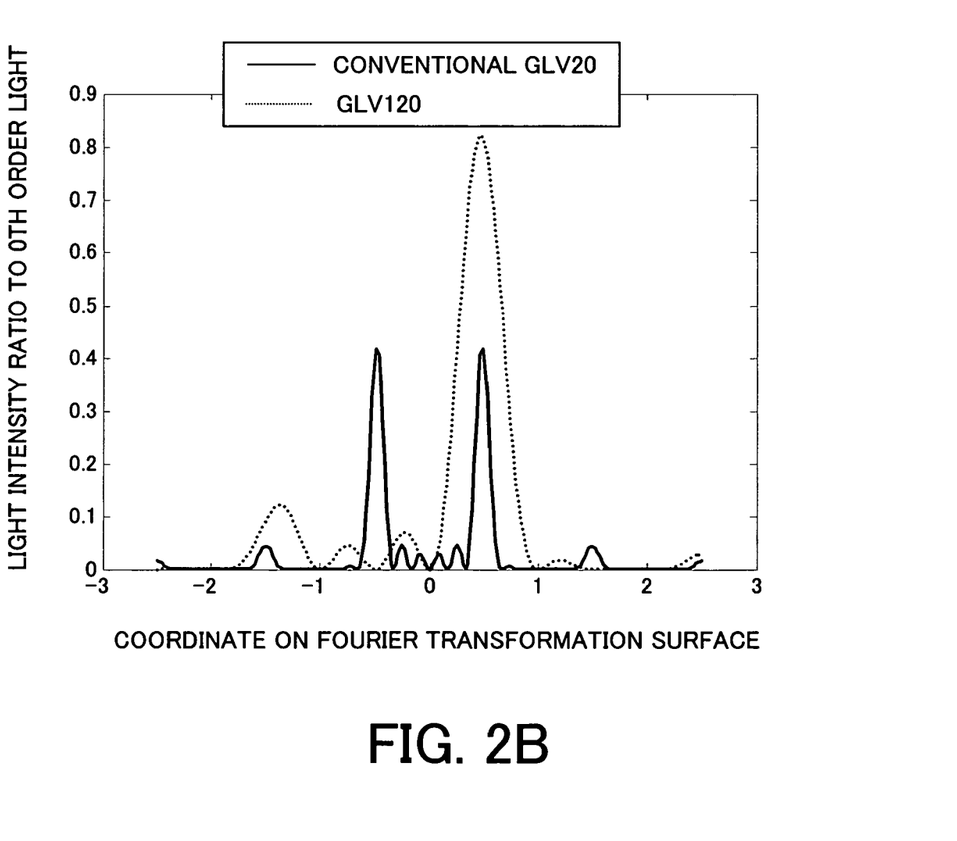
FIG. 2B is a graph of a light intensity distribution of a reflected light that compares the GLV shown in FIG. 2A with a conventional GLV.

FIG. 2A shows a relationship between the section of the GLV 120 and phase differences given by the GLV 120 when the GLV 120 turns on. FIG. 2B is a graph of a light intensity distribution of a reflected light that compares the GLV 120 with the conventional GLV 20.

The GLV 120 has plural pixels 121, each pixel 121 having one element 122. Each element 122 has four ribbons 123 that provide the reflected lights with phase differences of 0°, 90°, 180° and 270° in this order. Thus, this GLV 120 is a four-phase, one-period GLV. These phase differences are implemented, for example, by applying different voltages to each ribbon 123. The light intensity distribution of the reflected light from the GLV 120 has, as shown in FIG. 2B, a peak at the 1st order diffracted light, and the intensity of the −1st order diffracted light is very weak. In FIG. 2B, the ordinate axis denotes the diffraction efficiency, and the abscissa axis denotes a coordinate on the Fourier transformation surface. Therefore, the light intensity loss of the GLV 120 is smaller than that of the GLV 20, when the GLV 120 disposes of the −1st order diffracted light and uses only the 1st order diffracted light.

Figure 3A:
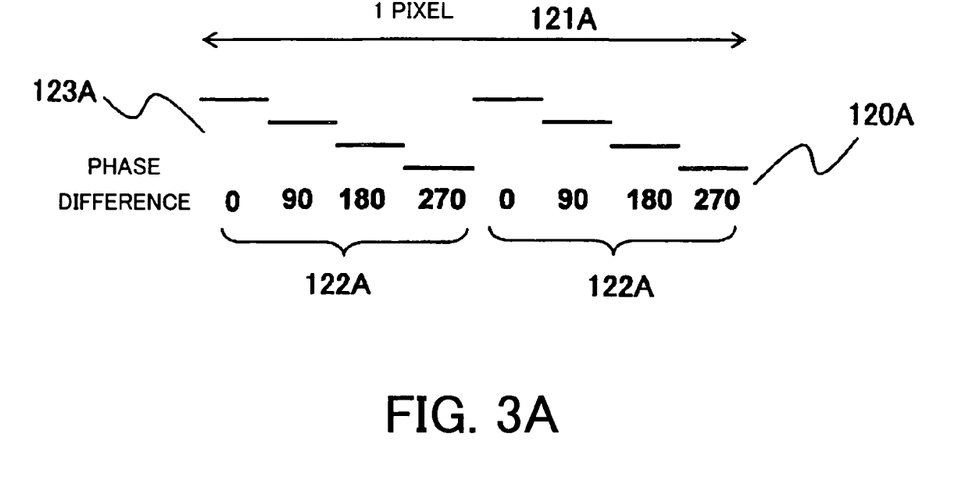
Figure 3B:
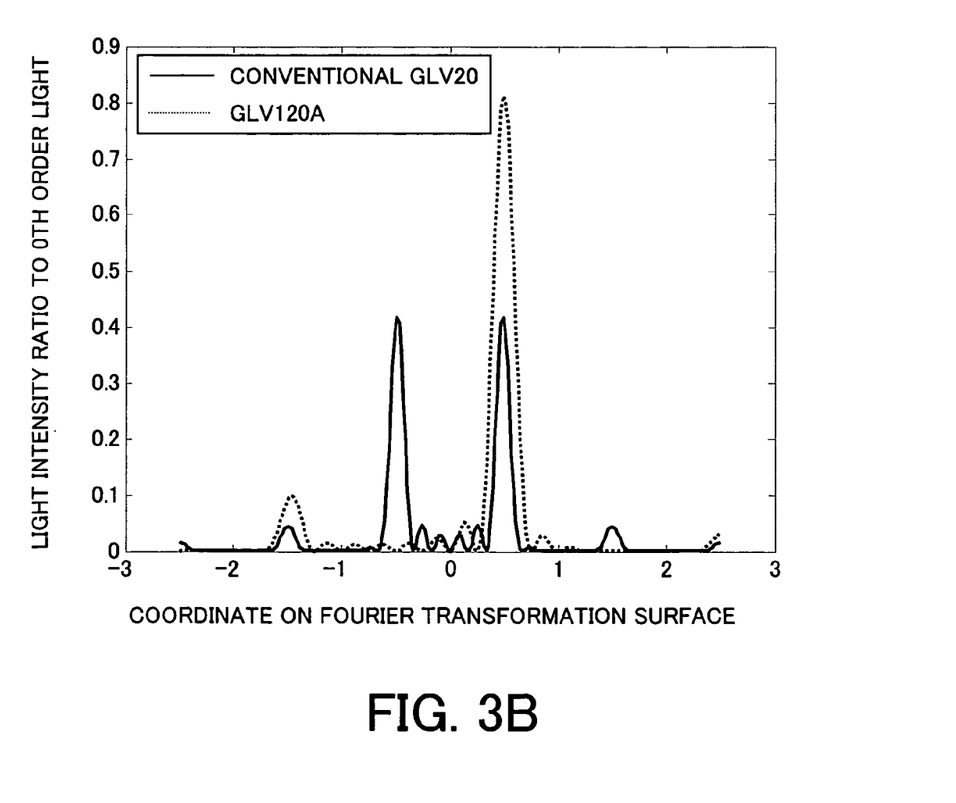
FIG. 3B is a graph of a light intensity distribution of a reflected light that compares the GLV shown in FIG. 3A with the conventional GLV.

The 1st order diffracted light spreads relatively widely, and may overlap the 0th order light in the GLV 120. As a solution for this problem, the GLV 120A shown in FIGS. 3A and 3B is preferred. Here, FIG. 3A shows a relationship between the section of the GLV 120A and phase differences given by the GLV 120A when the GLV 120A turns on. FIG. 3B is a graph of a light intensity distribution of a reflected light that compares the GLV 120A with the conventional GLV 20. In FIG. 3B, the ordinate axis denotes the diffraction efficiency, and the abscissa axis denotes a coordinate on the Fourier transformation surface. The OFF state of the GLV 120A corresponds to FIG. 12A.

The GLV 120A has plural pixels 121A, each pixel 121A having two elements 122A. Each element 122A has four ribbons 123A that provide the reflected lights with phase differences of 0°, 90°, 180° and 270° in this order. Thus, the GLV 120A is a four-phase, two-period GLV. These phase differences are implemented, for example, by applying different voltages to each ribbon 123A. The light intensity distribution of the reflected light from the GLV 120A has, as shown in FIG. 3B, a higher peak at the 1st order diffracted light, and the intensity of the −1st order diffracted light is weaker. Therefore, the light intensity loss of the GLV 120 is smaller than that of the GLV 20, when the GLV 120 disposes of the −1st order diffracted light and uses only the 1st order diffracted light. Since the 1st order diffracted light spreads narrowly, the 1st order diffracted light is less likely to overlap the 0th order light.

Figure 4A:
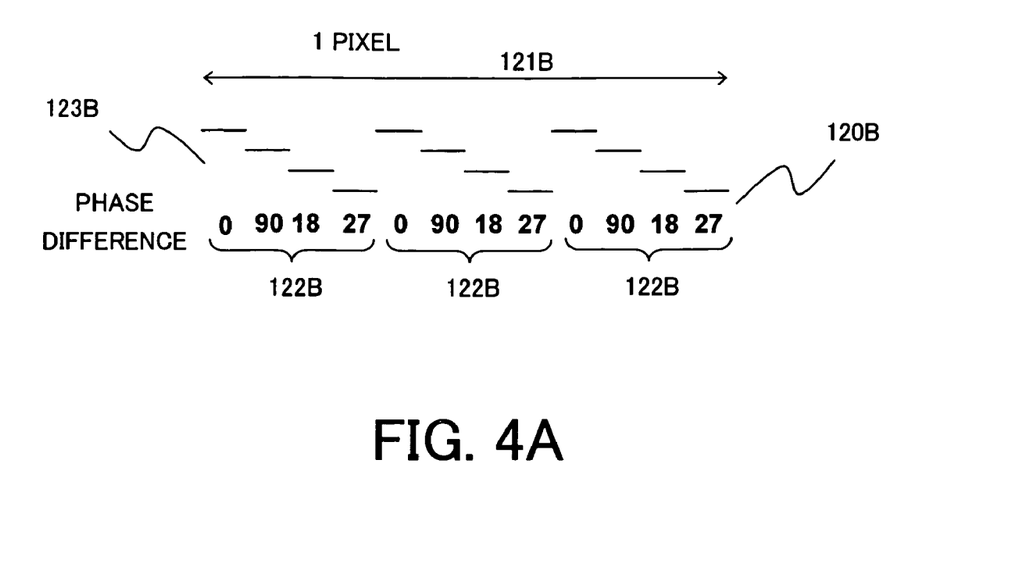
Figure 4B:
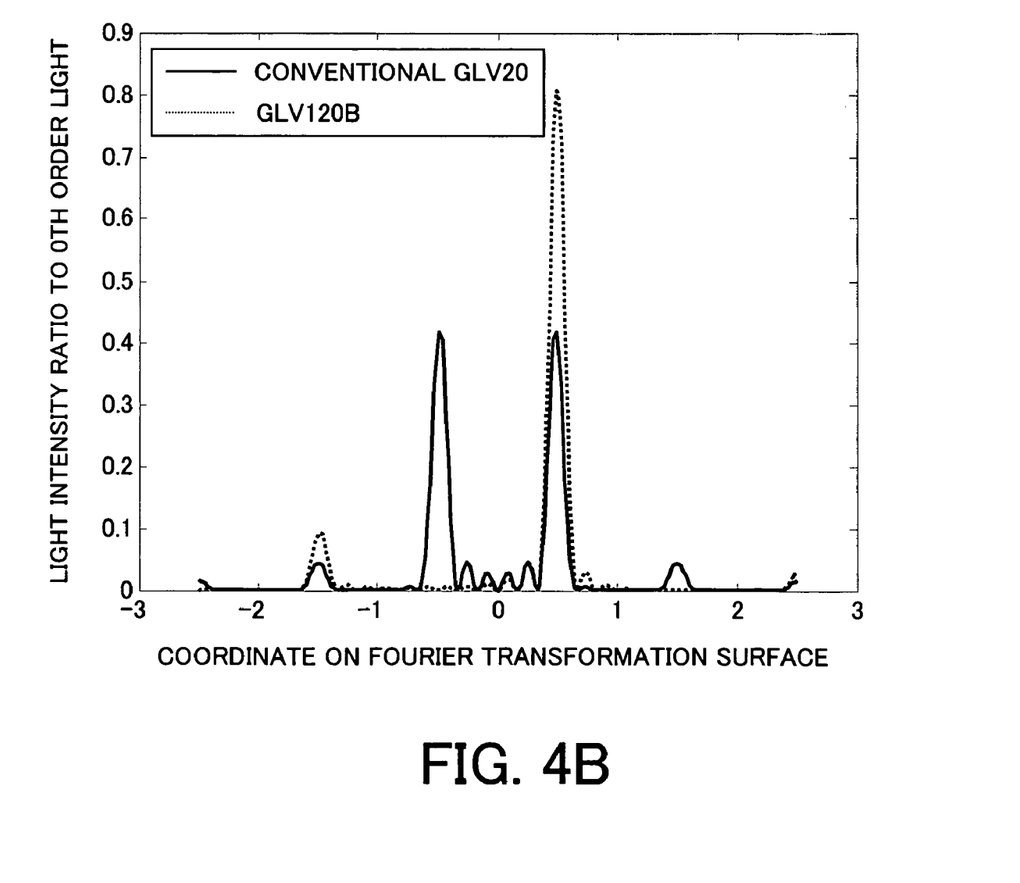
FIG. 4B is a graph of a light intensity distribution of a reflected light that compares the GLV shown in FIG. 4A with the conventional GLV.

FIG. 4A shows a relationship between the section of a GLV 120B and the phase differences given by the GLV 120B when the GLV 120B turns on. FIG. 4B is a graph of a light intensity distribution of a reflected light that compares the GLV 120B with the conventional GLV 20. The OFF state of the GLV 120B corresponds to FIG. 12A.

The GLV 120B has plural pixels 121B, each pixel 121B having three elements 122B. Each element 122A has four ribbons 123B that provide the reflected lights with phase differences of 0°, 90°, 180° and 270° in this order. Thus, this GLV 120B is a four-phase, three-period GLV. These phase differences are implemented, for example, by applying different voltages to each ribbon 123B. The light intensity distribution of the reflected light from the GLV 120B has, as shown in FIG. 4B, a higher peak at the 1st order diffracted light, and the intensity of the −1st order diffracted light almost extinguishes. In FIG. 4B, the ordinate axis denotes the diffraction efficiency, and the abscissa axis denotes a coordinate on the Fourier transformation surface. Therefore, the light intensity loss of the GLV 120 is smaller than that of the GLV 20, when the GLV 120 disposes of the −1st order diffracted light and uses only the 1st order diffracted light. Since the 1st order diffracted light spreads narrowly, the 1st order diffracted light is less likely to overlap the 0th order light.

Optically speaking, as the number of phases increases, a peak of the light intensity concentrates on one of the ±1st order diffracted lights. Three or more periods are preferable in terms of the width of the width of the diffracted light.

Figure 5A:
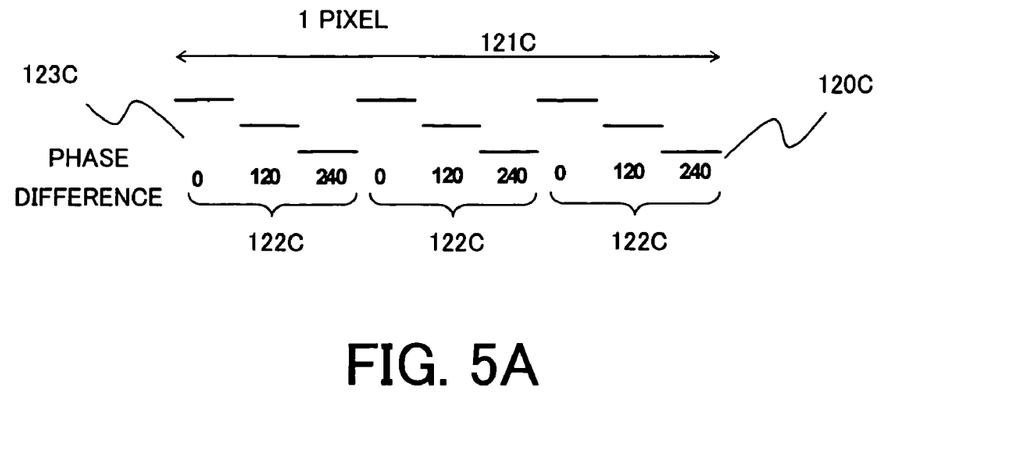
Figure 5B:
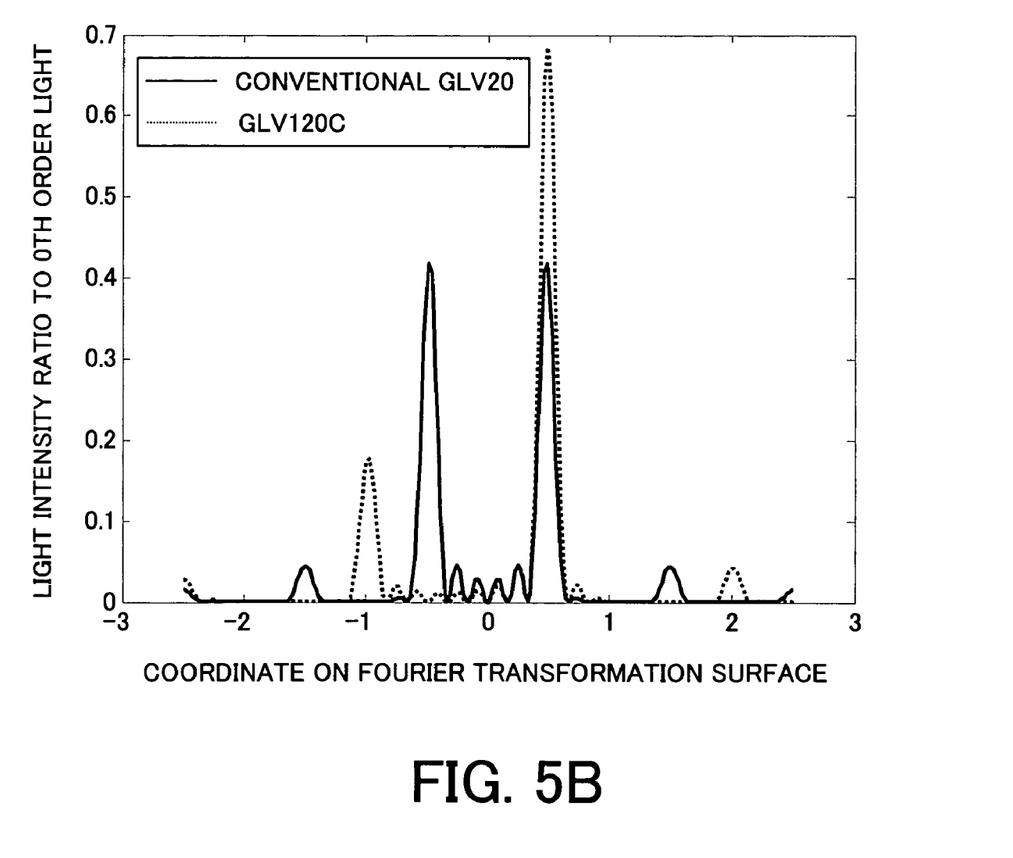
FIG. 5B is a graph of a light intensity distribution of a reflected light that compares the GLV shown in FIG. 5A with the conventional GLV.

FIGS. 5A and 5B show a GLV 120C that satisfies this condition. FIG. 5A shows a relationship between the section of the GLV 120C and phase differences given by the GLV 120C when the GLV 120C turns on. FIG. 5B is a graph of a light intensity distribution of a reflected light that compares the GLV 120C with the conventional GLV 20. In FIG. 5B, the ordinate axis denotes the diffraction efficiency, and the abscissa axis denotes a coordinate on the Fourier transformation surface. The OFF state of the GLV 120C corresponds to FIG. 12A.

The GLV 120C has plural pixels 121C, each pixel 121C having three elements 122C. Each element 122A has three ribbons 123C that provide the reflected lights with phase differences of 0°, 120° and 240° in this order. Thus, this GLV 120B is a three-phase, three-period GLV. These phase differences are implemented, for example, by applying different voltages to each ribbon 123C. The light intensity distribution of the reflected light from the GLV 120C has, as shown in FIG. 5B, a higher and narrower peak at the 1st order diffracted light, and the intensity of the −1st order diffracted light is sufficiently small.

Thus, the GLV 120 weakens one of the ±1st order diffracted lights and strengthens the other one, while the reference numeral 120 generalizes 120A, etc. The light intensity loss of the GLV 120 is smaller than that of the GLV 20 when the GLV 120 uses only one of the first order diffracted lights. In order to strengthen the ±1st order diffracted light while weaken the 1st order diffracted light, the phase differences of the ribbons may be inversely arranged in each element, like 270°, 180°, 90° and 0° in this order.

The phase PD1 given to the reflected light by an m-th period, l-th ribbon 123 in the pixel 121 in an n-phase type GLV 120 is expressed as follows, where the reference numeral 121 generalizes 121A etc.:

$$PD1=(360°/n) \times l + a \quad \text{Equation 1}$$

When PD1 is greater than 360°, PD1-360 is redefined as PD1.

Two adjacent ribbons 123 have a phase difference of (360°/n), where 0° and 360° are equivalently treated. While this embodiment sets "a" to −90, "a" does not have to be −90 as described in detail below.

Second Embodiment

The resolving power is as an index to indicate how fine pattern can be exposed and is one determinant of the performance of the semiconductor exposure apparatus.

Figure 6A:
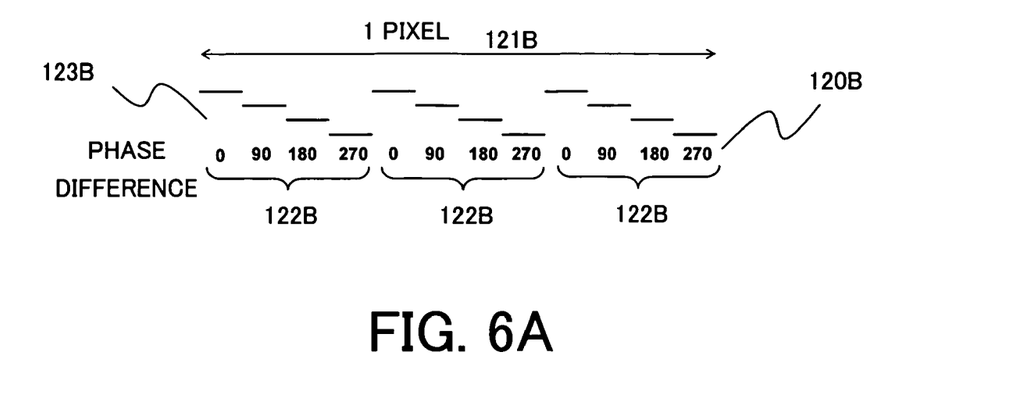
Figure 6B:
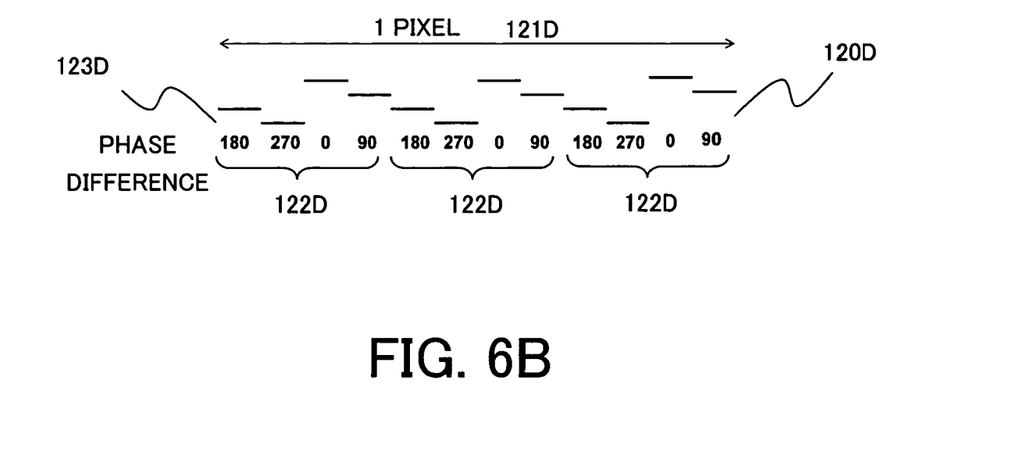

FIGS. 6A and 6B show sections of the GLVs 120B and 120D. The GLVs 120B and 120D have plural pixels 121B and 121D. The pixel 121B has the structure shown in FIGS. 4A and 6A. The pixel 121D has, as shown in FIG. 6B, ribbons 123D whose phase differences are different by 180° from the ribbons 123B in the pixel 121B. In other words, a phase difference of 180° occurs between two adjacent pixels 121B and 121D. More specifically, the ribbons 123D are arranged as shown in FIG. 6B so that they have phase differences of 180°, 270°, 0° and 90° corresponding to the phase differences of 0°, 90°, 180° and 270° of the ribbons 123B in FIG. 6A. When the diffracted lights whose phase differences shift by 180° interfere with each other, the lights from the adjacent pixels 121b and 121D cancel out each other. Therefore, the light intensity becomes 0 in the middle of the light spot formed from both pixels 121b and 121D, increasing the contrast. This arrangement of the GLVs 120B and 120D, the resolving power improves about twice as strong as that of the conventional GLV 20 in principle.

A difference of the phase difference between adjacent GLVs does not have to be 180°, and the difference other than 180° is feasible depending upon pattern transferring. For example, assume a difference of 90° of the phase difference is set between adjacent GLVs. The difference of 90° of the phase difference cannot be set between adjacent GLVs in the conventional two-stage GLV that provides modulating phase differences of merely 0° and 180° to adjacent pixels but cannot set other phase differences. However, this is feasible in the multiphase GLV.

Control over the phase difference of the reflected light (phase modulation) could thus improve the resolving power.

In such an n-phase GLV, a phase PD2 provided by m-th period, l-th ribbon in one pixel to the reflected light is given as follows:

$$PD2=(360°/n) \times l + a \quad \text{EQUATION 2}$$

When PD2 is greater than 360°, PD2-360 is redefined as PD2.

A phase PD3 provided by m-th period, l-th ribbon in adjacent pixels to the reflected light is given as follows. (a−b) is a difference to be given to adjacent pixels:

$$PD2=(360°/n) \times l + b \quad \text{EQUATION 3}$$

When PD3 is greater than 360°, PD3-360 is redefined as PD3.

Third Embodiment

The GLV 120 of this embodiment could control the amplitude of the reflected, diffracted light. For example, assume an optical system that uses only the 1st order diffracted light from the four-phase, three-period GLV 120B shown in FIG. 4A. This optical system can be implemented by a blocking filter for the −1st order diffracted light shown in FIG. 13 or an oblique incident optical system shown in FIG. 14.

In transferring a pattern in the semiconductor exposure apparatus, a mask often utilizes an auxiliary pattern that is too small to resolve so as to enhance the resolution of a desired pattern. However, in the maskless exposure apparatus that utilizes the GLV 120, each pixel 121 has the same size in the GLV 120, and setting of the auxiliary pattern is difficult. Since the auxiliary pattern generates the optically weak light, control over the light intensity of the diffracted light generated by the GLV 120 provides a substitute of the auxiliary pattern.

Figure 7:
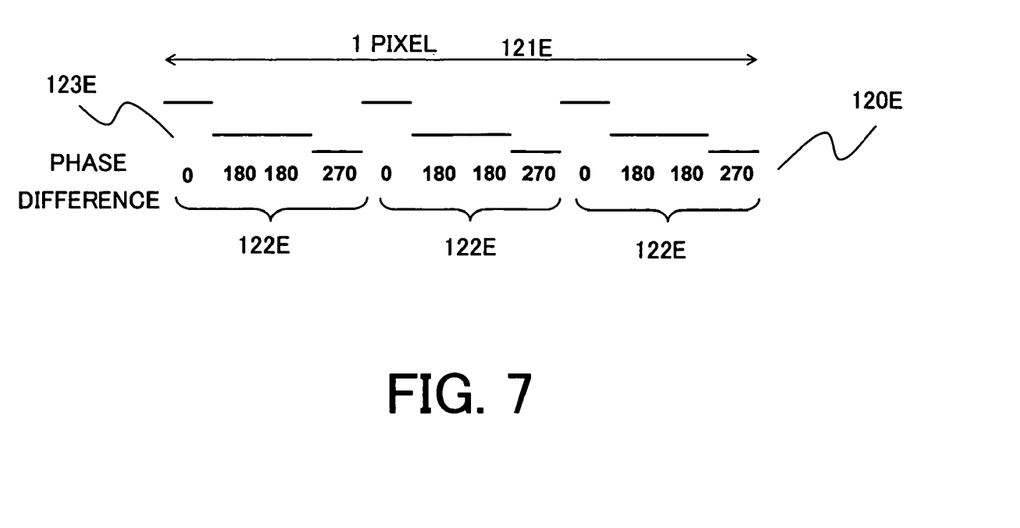
Figure 8:
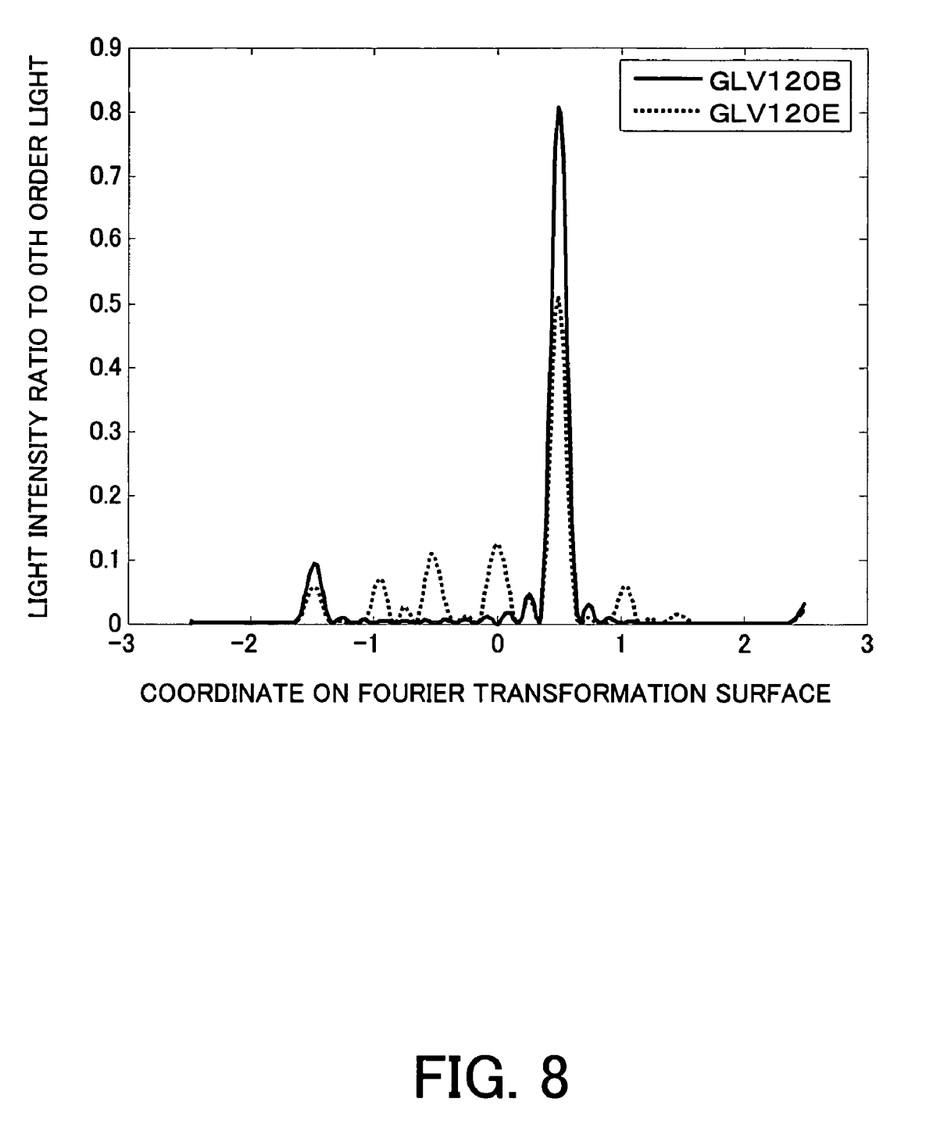
FIG. 8 is a graph of the diffracted light intensity that compares the GLV shown in FIG. 7 with the GLV shown in FIG. 4A.

In order to control the intensity of the diffracted light, this embodiment replaces a structure of the GLV 120B with a GLV 120E shown in FIG. 7. The GLV 120E changes phases of the GLV 120B by 180°. The GLV 120E has plural pixels 121E, each pixel 121E having three elements 122E. Each element 122E has four ribbons 123E that provide the reflected lights with phase differences of 0°, 180°, 180°, and 270° in this order. Therefore, this GLV 120E is a four-phase, three-period GLV. These phase differences are implemented, for example, by applying different voltages to each ribbon 123E. FIG. 8 shows the light intensity distribution of the diffracted light that compares the GLV 120E with the GLV 120B. It is understood that the light intensity of the 1st order diffracted light emitted from the GLV 120E is weaker than that emitted from the GLV 120B.

According to this embodiment, the multiphase GLV varies the intensity of the diffracted light (which is referred to as an amplitude modulation) and produces the auxiliary pattern. Characteristically, the n-stage GLV of this embodiment is configured to provide a phase difference other than (360/n) degrees between two adjacent ribbons in the pixel 121 where 0° is equivalent with 360°.

A combination between the amplitude modulation and the phase modulation can realize a half-tone mask, i.e., a mask that maintains a constant light intensity in the background and a constant phase in the background.

Fourth Embodiment

Figure 1:
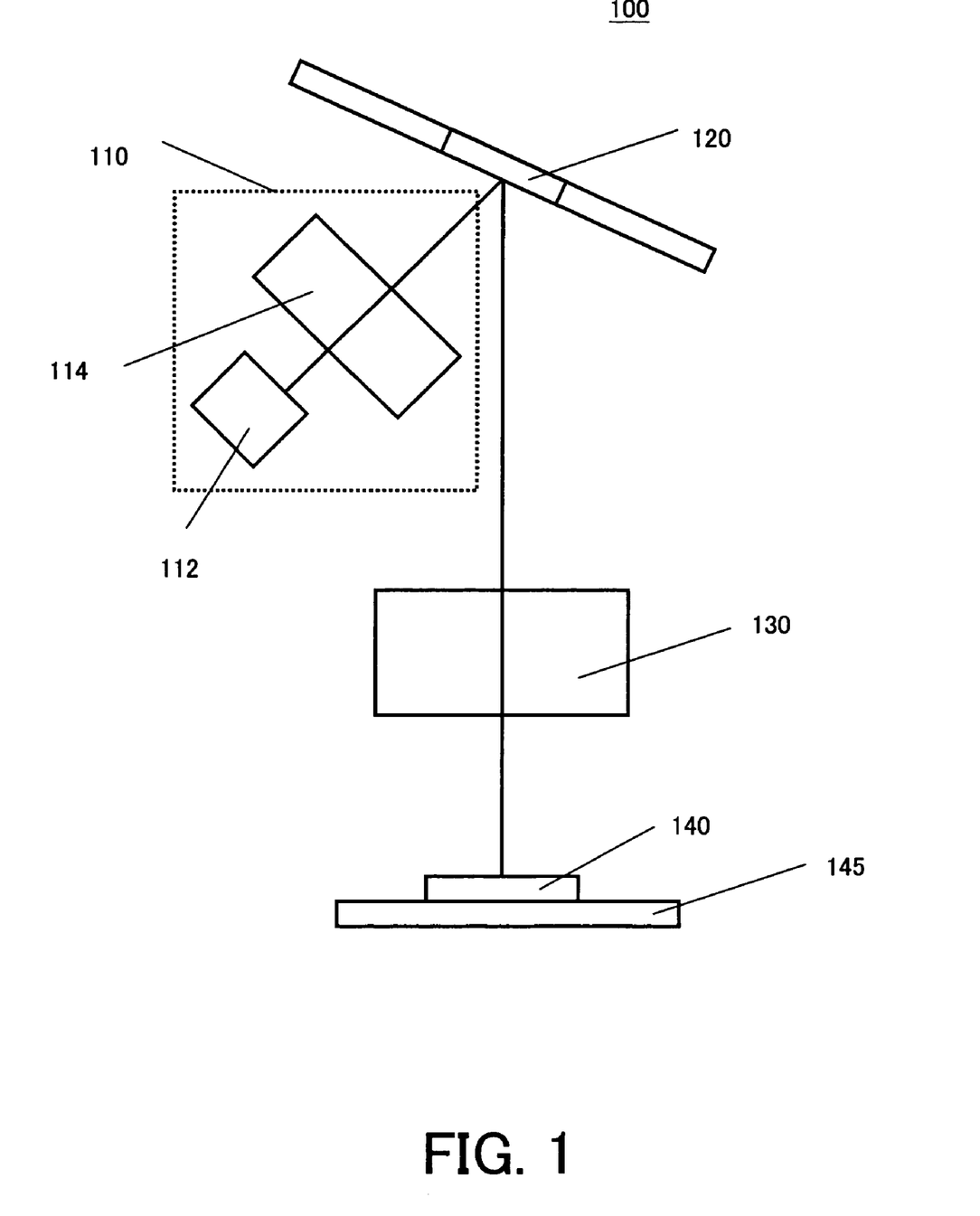
FIG. 1 is a schematic block diagram of an exposure apparatus according to one embodiment of the present invention.

A description will be given of the exposure apparatus 100 that utilizes the inventive GLV. Here, FIG. 1 is a schematic block diagram of the illustrative exposure apparatus 100 according to the present invention. The exposure apparatus 100 includes an illumination apparatus 110 that illuminates the above GLV 120, a projection apparatus 130 that projects onto a plate 140 the diffracted light generated from the illuminated GLV 120, and a stage 145 that supports the plate 140.

The exposure apparatus 100 is suitable for a submicron or quarter-micron lithography process, and this embodiment discusses a step-and-scan exposure apparatus (also referred to as a "scanner"). The "step-and-scan manner", as used herein, is an exposure method that exposes a pattern onto a wafer by continuously scanning the wafer relative to the GLV 120, and by moving, after a shot of exposure, the wafer stepwise to the next exposure area to be shot. The "step-and-scan manner" is another mode of exposure method that moves a wafer stepwise to the next exposure area after exposure to one shot ends.

The illumination apparatus 110 includes a light source section 112 and an illumination optical system 114, and illuminates the GLV 120 that is controlled in accordance with a circuit pattern to be transferred.

The light source section 112 uses, for example, a light source such as an ArF excimer laser with a wavelength of approximately 193 nm, a KrF excimer laser with a wavelength of approximately 248 nm, and an an $F_2$ laser having a wavelength of about 157 nm. However, the type of the light source is not limited or the number of light sources is not limited. When using a laser, the light source section 112 preferably uses a light shaping optical system that turns the collimated light from the laser light source into a desired beam shape, and an incoherently turning optical system that turns a coherent laser beam into an incoherent one.

The illumination optical system 114 is an optical system that illuminates the GVL 120, and includes a lens, a mirror, an optical integrator, a stop and the like, for example, a condenser lens, a fly-eye lens, an aperture stop, a condenser lens, a slit, and an imaging optical system in this order. The illumination optical system 114 can use any light regardless of whether it is axial or non-axial light. The light integrator may include a fly-eye lens or an integrator formed by stacking two sets of cylindrical lens array plates (or lenticular lenses), and can be replaced with an optical rod or a diffractive optics. A method for illuminating the GLV may be a perpendicular irradiation as in the prior art, or an oblique irradiation. The illumination optical system 114 may utilize the optical system shown in FIG. 13 for the perpendicular irradiation, and the optical system shown in FIG. 13 for the oblique irradiation.

The GLV 120 whose switch is electrically turned on and off from the outside controls the diffracted light, and is supported and driven by a GLV stage (not shown). The diffracted light is projected onto the plate 140 through the projection optical system 130. The GLV 120 and the plate 140 have an optically conjugate relationship. Since the exposure apparatus 100 of this embodiment is a scanner, the GLV 120 repeats turning on and off while the exposure apparatus scans the plate 140 at a speed ratio corresponding to a reduction ratio, transferring the pattern of the GLV 120 onto the plate 140.

The projection optical system 130 may use a dioptric optical system that includes only plural lens elements, a catadioptric optical system comprised of a plurality of lens elements with at least one concave mirror, and a catoptric optical system including only mirrors, and so on. Any necessary correction of a chromatic aberration in the projection optical system 130 can use a plurality of lens elements made from glass materials having different dispersion or Abbe values, or arrange a diffraction optical element such that it disperses in a direction opposite to that of the lens element.

The plate 140 is an exemplary object to be exposed, such as a wafer and a LCD, and photoresist is applied to the plate 230. A photoresist application step includes a pretreatment, an adhesion accelerator application treatment, a photoresist application treatment, and a pre-bake treatment. The pretreatment includes cleaning, drying, etc. The adhesion accelerator application treatment is a surface reforming process so as to enhance the adhesion between the photoresist and a base (i.e., a process to increase the hydrophobicity by applying a surface active agent), through a coat or vaporous process using an organic film such as HMDS (Hexamethyldisilazane). The pre-bake treatment is a baking (or burning) step, softer than that after development, which removes the solvent.

The stage 145 supports the plate 140. The stage 145 may use any structure known in the art, and a detailed description of its structure and operations will be omitted. For example, the stage 145 uses a linear motor to move the plate 140 in the XY directions orthogonal to the optical axis. The GLV 120 and plate 140 are, for example, scanned synchronously, and positions of the GLV stage (not shown) and stage 145 are monitored, for example, by a laser interferometer and the like. The GLV 120 is turned on and off in accordance with driving of the stage 145. The stage 145 is installed on a stage stool supported on the floor and the like, for example, via a damper. The GLV stage and the projection optical system 130 are provided, for example, on a barrel stool (not shown) that is supported on a base frame placed on the floor, for example, via a damper.

In exposure, the light emitted from the light source section 112, for example, Koehler-illuminates the GLV 120 through the illumination optical system 114. The light that has been reflected by the GLV 120 and reflects the pattern forms an image on the plate 140 through the projection optical system 130. The GLV 120 in the exposure apparatus 100 does not restricts the NA or loses the light intensity. Therefore, the exposure apparatus 100 can provide high-quality devices (such as semiconductor devices, LCD devices, image pickup devices (such as CCDs), and thin film magnetic heads) with excellent work efficiency.

While this embodiment introduces the step-and-scan manner, another manner is applicable. For example, rather than the wafer is stepped after exposure to one shot ends, the other manner 1) exposes only first part within the one shot and steps the wafer, 2) similarly exposes only the first part in the next shot and repeats this procedure for all the shots, and 3) returns to the initial shot, and repeats the similar action for second part different from the first part.

Figure 9:
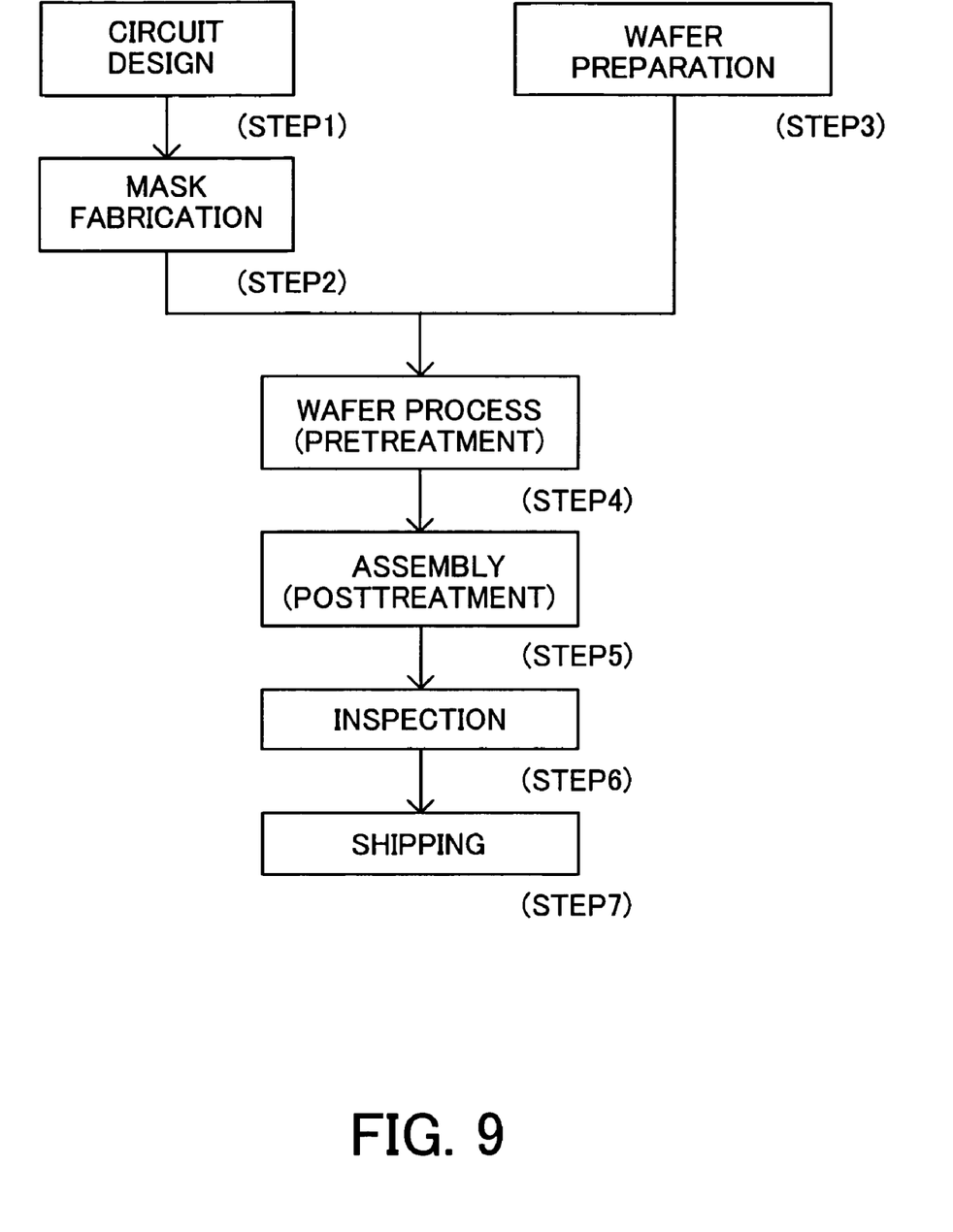
FIG. 9 is a flowchart for explaining a method for fabricating devices (semiconductor chips such as ICs, LSIs, and the like, LCDs, CCDs, etc.).
Figure 10:
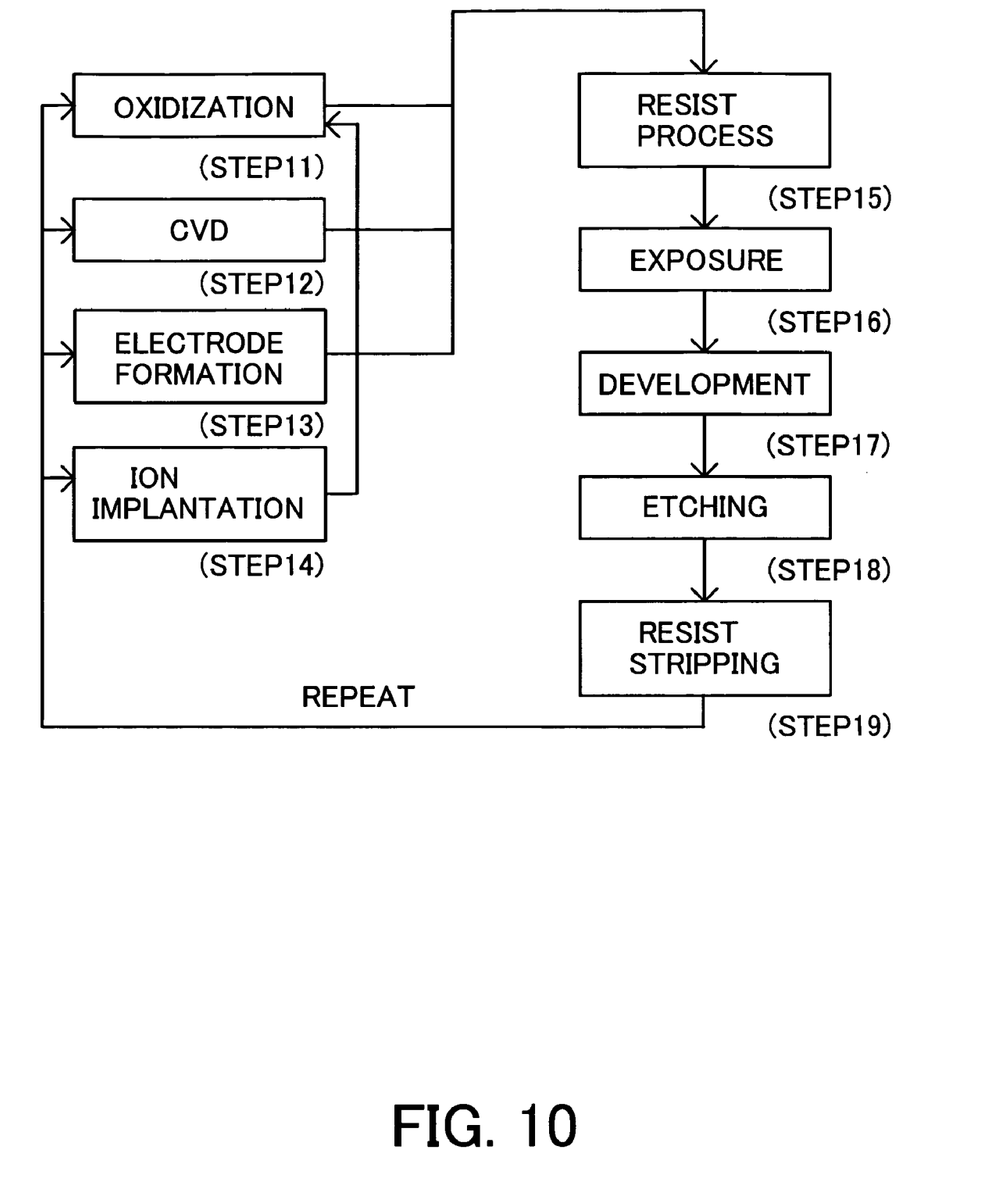
FIG. 10 is a detailed flowchart for Step 4 of wafer process shown in FIG. 9.

Referring now to FIGS. 9 and 10, a description will now be given of an embodiment of a device manufacturing method using the above exposure apparatus 100. FIG. 9 is a flowchart for explaining a fabrication of devices (i.e., semiconductor chips such as IC and LSI, LCDs, CCDs, etc.). Here, a description will be given of a fabrication of a semiconductor chip as an example. Step 1 (circuit design) designs a semiconductor device circuit. Step 2 (mask fabrication) sets the GLV operation during exposure or an input signal to the GLV in order to form a designed circuit pattern. Step 3 (wafer preparation) manufactures a wafer using materials such as silicon. Step 4 (wafer process), which is referred to as a pretreatment, forms actual circuitry on the wafer through photolithography using the GLV and wafer. Step 5 (assembly), which is also referred to as a posttreatment, forms into a semiconductor chip the wafer formed in Step 4 and includes an assembly step (e.g., dicing, bonding), a packaging step (chip sealing), and the like. Step 6 (inspection) performs various tests for the semiconductor device made in Step 5, such as a validity test and a durability test. Through these steps, a semiconductor device is finished and shipped (Step 7).

FIG. 10 is a detailed flowchart of the wafer process in step 4. Step 11 (oxidation) oxidizes the wafer's surface. Step 12 (CVD) forms an insulating film on the wafer's surface. Step 13 (electrode formation) forms electrodes on the wafer by vapor disposition and the like. Step 14 (ion implantation) implants ions into the wafer. Step 15 (resist process) applies a photosensitive agent onto the wafer. Step 16 (exposure) uses the exposure apparatus 100 to expose a circuit pattern formed by the GLV onto the wafer. Step 17 (development) develops the exposed wafer. Step 18 (etching) etches parts other than a developed resist image. Step 19 (resist stripping) removes disused resist after etching. These steps are repeated, and multilayer circuit patterns are formed on the wafer. This device manufacturing method can manufacture higher-quality devices than the conventional method without a mask.

Fifth Embodiment

Figure 11:
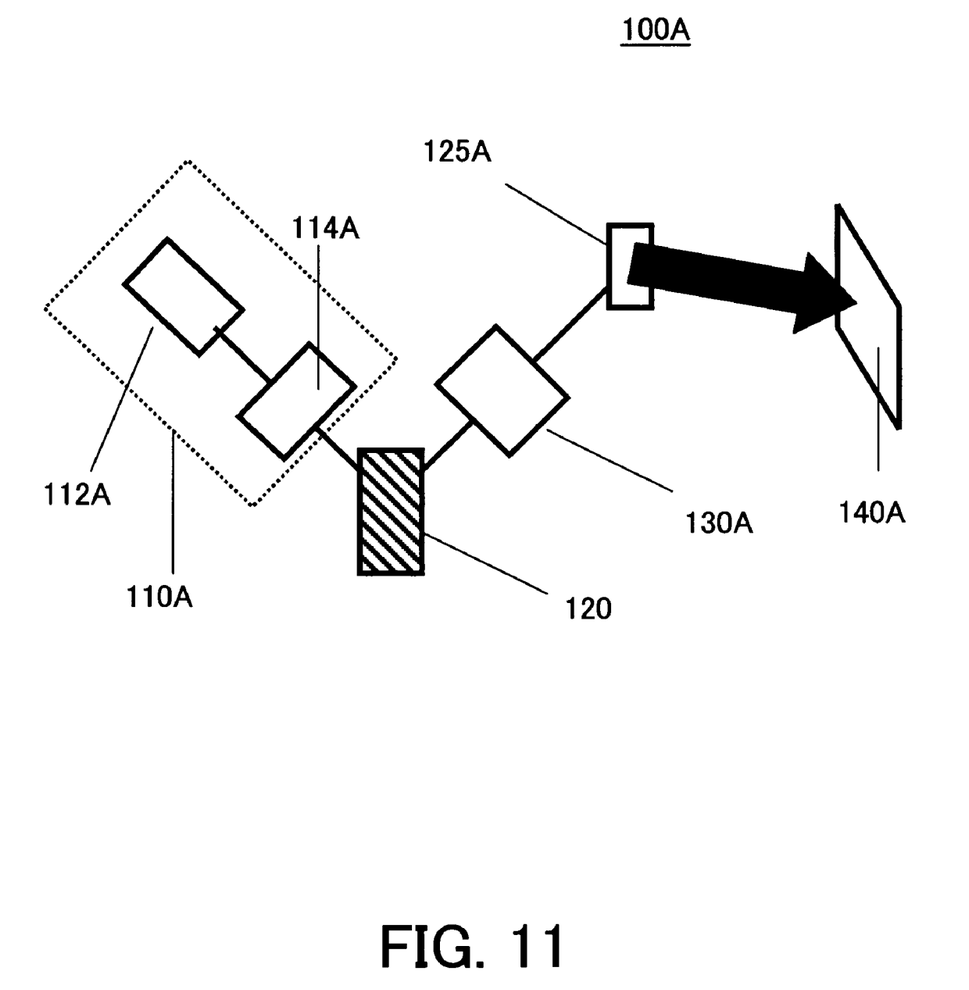
FIG. 11 is a schematic block diagram of a display apparatus according to one embodiment of the present invention.

Referring now to FIG. 11, a description will be given of the image display apparatus 100A according to the present invention. FIG. 11 is a schematic block diagram of the illustrative image display apparatus 100A according to the present invention. The image display apparatus 100A includes an illumination apparatus 110A, a projection optical system 130A, and a control mirror that controls the light that transmits through the projection optical system 130A. A screen 140A is used to display a projected image. The illumination apparatus 110A includes a light source section 112A and an illumination optical system 114A, and illuminates the GLV 120. The illumination optical system 114A is an optical system for illuminating the GLV 120. While a method for illuminating the GLV 120 may be the perpendicular or oblique irradiation, the oblique incidence illumination is effective to the inventive GLV 120. The illumination optical system 114A may utilize the optical system shown in FIG. 13 for the perpendicular irradiation, and the optical system shown in FIG. 13 for the oblique irradiation.

The GLV 120 whose switch is electrically turned on and off from the outside controls the diffracted light, and is supported and driven by a GLV stage (not shown). The diffracted light is irradiated onto the control mirror 125A through the projection optical system 130A. The light controlled by the control mirror 125A is projected onto the screen 140A.

The projection optical system 130A may use a dioptric optical system that includes only plural lens elements, a catadioptric optical system comprised of a plurality of lens elements with at least one concave mirror, and a catoptric optical system including only mirrors, and so on. Any necessary correction of a chromatic aberration in the projection optical system 130 can use a plurality of lens elements made from glass materials having different dispersion or Abbe values, or arrange a diffraction optical element such that it disperses in a direction opposite to that of the lens element.

The image display apparatus that utilizes the GLV 120 can be thus configured.

Furthermore, the present invention is not limited to these preferred embodiments and various variations and modifications may be made without departing from the scope of the present invention.

The present invention thus reduces the inefficiently restricted NA and the light intensity losses in the maskless exposure apparatus that does not use a mask as an original, thereby promoting a development of an exposure apparatus that reconciles both the cost reduction and throughput of the device. In addition, the present invention provides high resolving power through control over a phase and/or amplitude of the diffracted light.

This application claims a foreign priority benefit based on Japanese Patent Applications No. 2004-278224, filed on Sep. 24, 2004, and 2005-232946, filed on Aug. 11, 2005, each of which is hereby incorporated by reference herein in its entirety as if fully set forth herein.

What is claimed is:

1. A light modulator for modulating a phase distribution of incident light, said light modulator comprising:
    an element that provides the incident light with three or more types of phase differences at the same time,
    wherein the element includes three or more displaceable light reflective bands, and
    wherein the light modulator has plural pixels each including the element.

2. A light modulator according to claim 1, wherein the phase differences in an aligning direction of the plural light reflective bands include 0°, 90°, 180° and 270°.

3. A light modulator according to claim 1, wherein the phase differences in an aligning direction of the plural light reflective bands include 0°, 120° and 240°.

4. A light modulator according to claim 1, wherein each pixel includes two adjacent light reflective bands that form the phase differences other than (360/n) degrees, where n is the number of types of the phase differences and a natural number greater than 3.

5. A light modulator according to claim 4, wherein the phase differences other than (360/n) degrees are 0° or a product between a natural number and (360/n) degrees.

6. A light modulator according to claim 4, wherein the phase differences in an aligning direction of the plural light reflective bands include 0°, 180°, 180° and 270°.

7. A light modulator according to claim 1, wherein plural elements are aligned so that the plural light reflective bands form a predetermined period.

8. A light modulator according to claim 1, wherein three or more elements are aligned so that the plural light reflective bands form a predetermined period.

9. A light modulator according to claim 1, wherein phase difference arrangements of the plural light reflective bands between two adjacent pixels shift from each other in an aligning direction of the plural light reflective bands.

10. An exposure apparatus comprising:
a light modulator according to claim 1; and
a projection optical system for projecting a pattern formed by said light modulator onto an object to be exposed.

11. An exposure apparatus according to claim 10, further comprising an illumination optical system for illuminating said light modulator in a direction oblique to an aligning direction of the plural light reflective bands in said light modulator.

12. An exposure apparatus according to claim 10, wherein said projection optical system receives diffracted light of a single order generated by said light modulator.

13. A projection type image display apparatus comprising:
a light modulator according to claim 1; and
a projection unit for projecting a pattern formed by said light modulator onto a target surface.

14. A device manufacturing method comprising the steps of:
exposing an object using an exposure apparatus according to claim 10; and
developing the object that has been exposed.

* * * * *